United States Patent
Waite

[15] 3,645,064
[45] Feb. 29, 1972

[54] PACKING MACHINE FOR BAKED GOODS

[72] Inventor: Fred L. Waite, 66 Clinton Pl., Massapequa, N.Y.

[22] Filed: July 9, 1970
[21] Appl. No.: 53,489

[52] U.S. Cl. .................................53/55, 53/164, 53/244, 53/252
[51] Int. Cl. ...........................B65b 57/02, B65b 57/10
[58] Field of Search................53/55, 159, 164, 244, 252

[56] References Cited

UNITED STATES PATENTS 3,456,418  7/1969  Mettler ............................53/159 X
3,512,336  5/1970  Rosecrans ........................53/244 X Primary Examiner—Travis S. McGehee
Attorney—J. Bradley Cohn

[57] ABSTRACT

Baked goods, such as muffins or donuts, are received from a belt onto a cyclically operated elevator which raises the goods to the level of a delivery slide from which the baked goods are pushed into a container. If the machine cycles twice for each container, the baked goods are stacked two high therein. To ensure that the goods are disposed flat within the container, pivotally mounted gravity biased fingers are mounted on the mechanism pushing the baked goods from the slide, the fingers holding down and urging downward the rear edges of the baked goods.

14 Claims, 13 Drawing Figures

Patented Feb. 29, 1972

INVENTOR:
FRED L. WAITE

BY

ATTORNEY

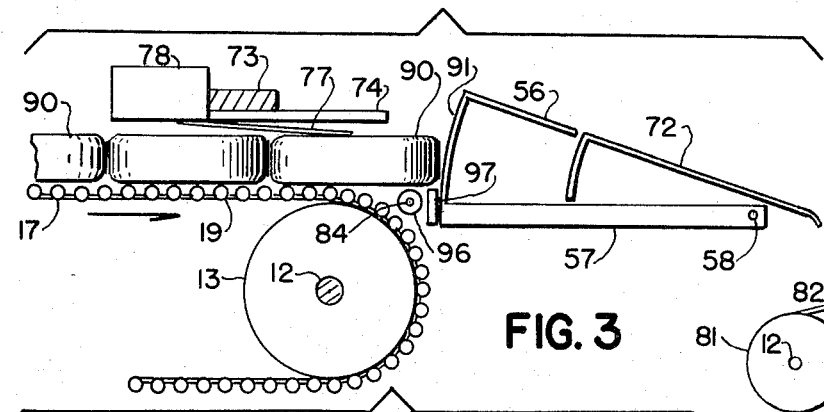
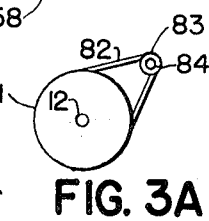
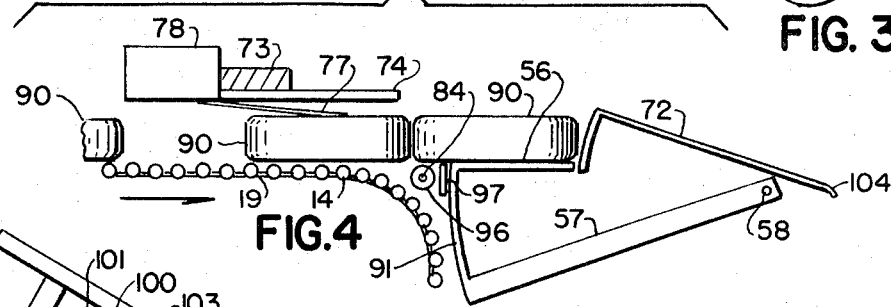
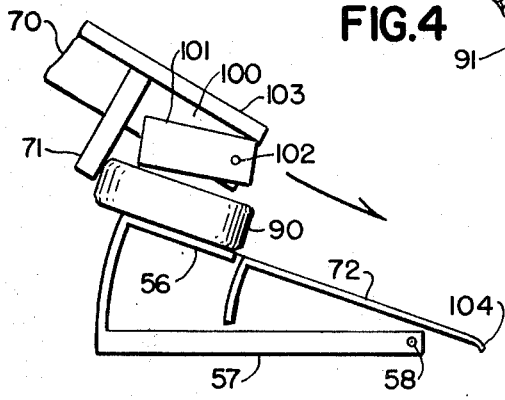
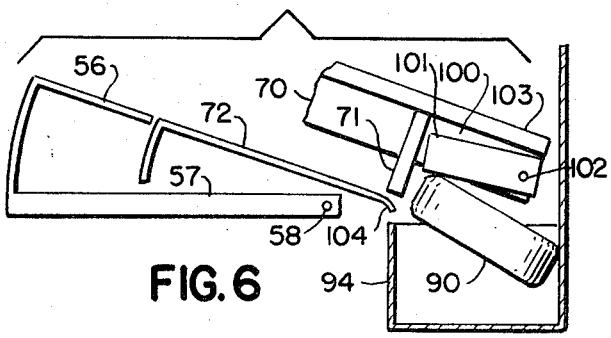
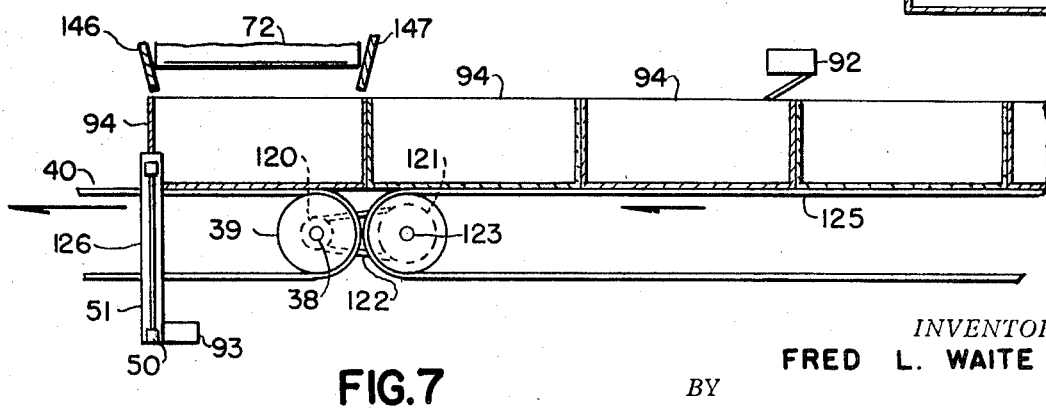

Patented Feb. 29, 1972

INVENTOR:
FRED L. WAITE

BY

ATTORNEY

PACKING MACHINE FOR BAKED GOODS

BACKGROUND OF THE INVENTION

There exists a need for a foolproof apparatus to automatically pack baked goods, such as muffins or donuts, flat in boxes in one or more layers. This invention supplies this need.

SUMMARY OF THE INVENTION

Baked goods are moved in aligned paths on a conveyor to an elevator having a front edge which acts as a stop for the baked goods. An electrically operated clutch drives a timing shaft having cranks, the timing shaft rotating once each cycle so that the cranks raise and lower the elevator to lift baked goods to the level of the delivery slide and so that the cranks operate a pusher mechanism to slide baked goods from the delivery slide into a container. Pivotally mounted, gravity-biased fingers on the pusher mechanism bear on the rearward portions of the baked goods to ensure that they land flat in the container. Sensing switches ensure that baked goods are in position at the start of each cycle and that a container is positioned for packing. Containers rest on a two-section conveyor belt with the container being packed resting on a section moving at a higher speed. The container being packed is held in position by a stop. The higher speed belt removes packed containers on release of the stop at a higher rate of speed than the slower belt moves subsequent containers into position for packing.

The specific construction and controls incorporated in the packing machine of this invention ensure that it will operate without jamming and without the attention of an operator. It operates with one drive motor and clutch with a fully automatic cycle. It packs delicate baked goods gently without damage. It will handle wider variations in size or irregularity of specific baked goods without jamming the packing machine.

BRIEF DESCRIPTION OF THE DRAWINGS

FIG. 3 is a longitudinal, vertical section through elements of the conveyor belt, the elevator, and the delivery slide with the elevator shown in the raised position;

FIG. 3A is a side view of the drive mechanism for the transfer roller.

FIG. 4 is a longitudinal, vertical section through elements of the conveyor belt, the elevator, and the delivery slide with the elevator shown in a lowered position receiving baked goods thereon;

FIG. 5 is a side view of the elevator, the delivery slide, and a fragment of the pusher mechanism shown engaging the baked goods on the elevator;

FIG. 6 is a side view of the elevator, the delivery slide, and a fragment of the pusher mechanism shown sliding baked goods into a container shown in section;

FIG. 7 is an end view of the packing machine showing cartons in longitudinal, vertical section resting on the two sections of a carton conveyor;

DESCRIPTION OF THE PREFERRED EMBODIMENT

Figures 1, 2:
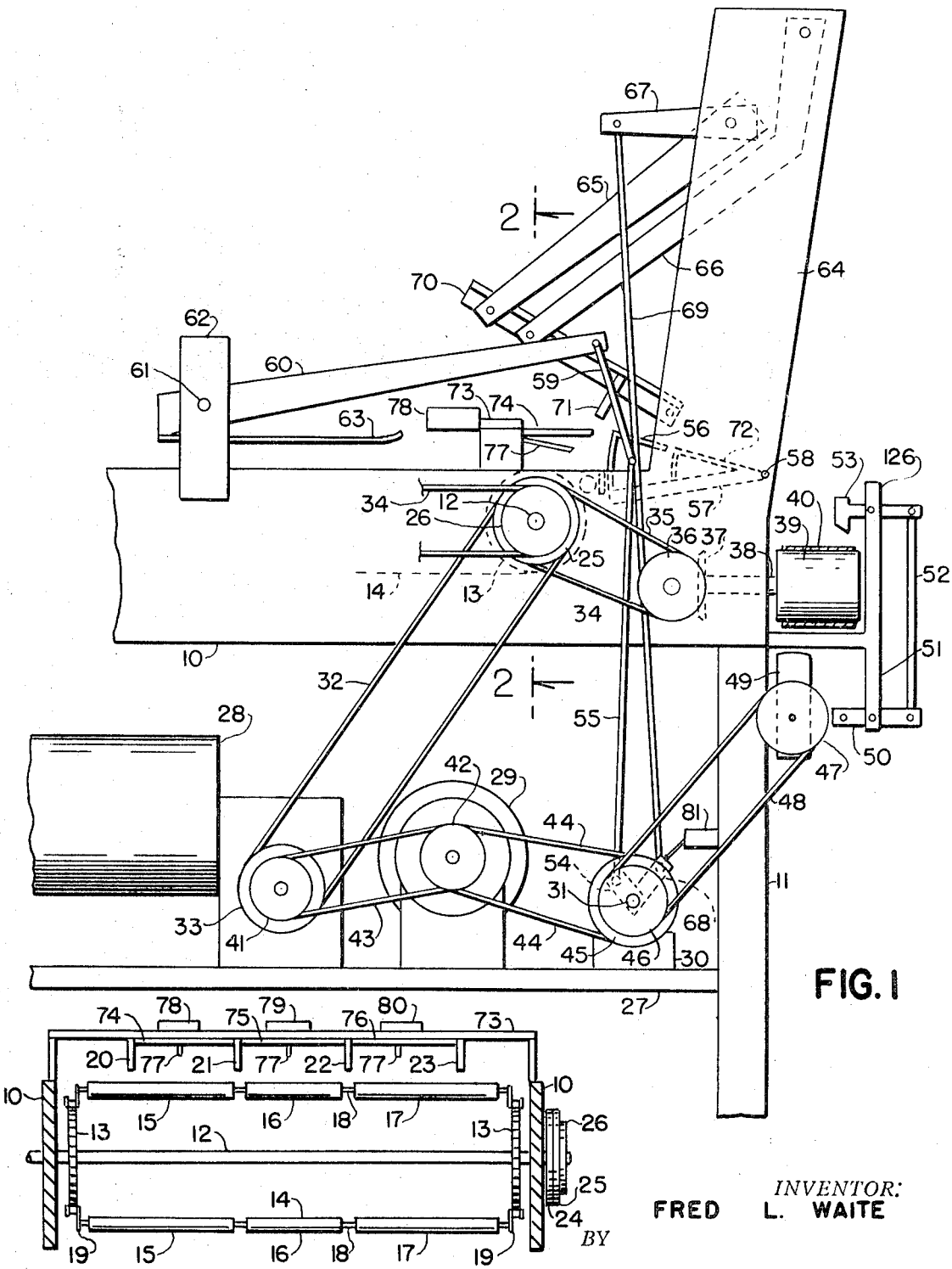
FIG. 1 is a side view of a broken away front end of the packing machine.
FIG. 2 is a transverse, vertical section through the conveyor belt of the packing machine taken on line 2—2 of FIG. 1 showing limit switches and hold downs positioned thereon.

As shown in FIGS. 1 and 2, side members 10 are supported by the legs 11. Shaft 12, journaled in side members 10, has a pair of sprockets 13 mounted on it about which pass an endless belt 14 of transverse rotatably mounted short lengths 15, 16 and 17 of rollers disposed about shafts 18 which are fixed between chains 19. Longitudinal guides 20, 21, 22 and 23, shown in FIG. 2, define paths or aligned rows of baked goods conveyed on the short lengths 15–17 of belt 14. Shaft 12 mounts three adjacent sprockets 24, 25 and 26.

On a shelf 27 below side members 10 there is mounted a gear head motor 28, an electrically activated clutch and brake 29, and timing shaft bearings 30 rotatably mounting the timing shaft 31. By means of sprockets 25, chain 32 and sprocket 33, motor 28 drives shaft 12 and conveyor belt 14. Sprocket 26 and chain 34 drive elements of the conveyor not shown as not being essential to this disclosure. Sprocket 24 behind sprocket 25 drives shaft 34 by means of belt 35 and sprocket 36. Shaft 34 mounts a bevel gear (not shown) which meshes with and drives bevel gear 37 mounted on shaft 38. Drum 39 on shaft 38 has the endless carton conveyor belt 40 disposed about it.

Referring further to FIG. 1, sprocket 41 of motor 28 drives an idler sprocket 42 of clutch 29 by means of chain 43. When engaged, a drive sprocket of clutch 29 drives chain 44 to rotate timing shaft 31 by means of sprocket 45. Sprockets 46 and 47 an chain 48 turn the carton release cam 49, according to the ratio of sprockets 46 and 47, for each one or two revolutions of timing shaft 31. Carton release cam 49 strikes follower 50 which is pivotally mounted in bracket 51. Follower 50, by means of connecting rod 52, pivots carton stop 53 to release a foremost carton (not shown) on belt 40.

As timing shaft 31 rotates, crank 54 pulls down rod 55 to lower elevator 56 which is pivotally mounted by member 57 at bearing 58. An articulated extension 59 of rod 55 urges down the pivotally mounted arm 60 which is fixed to shaft 61 journaled in the supports 62. The rotation of shaft 61 depresses spring arms 63 fixed thereto over each path of aligned baked goods on the conveyor 14.

Upward extensions 64 of side members 10 pivotally mount pairs of pusher mechanism arms 65 and 66. Crank arm 67 fixed to arm 65 is connected to crank 68 of timing shaft 31 by link 69. Thus rotation of timing shaft 31 swings arms 65 and 66 which mount the pusher bars 70 and the transverse flange 71. Flange 71 engages baked goods on elevator 56 and slide 72 as will be hereinafter described.

As may be further seen in FIGS. 1 and 2, a transverse bar 73 disposed above the upper run of roller belt 14 has fixed hold down 74, 75 and 76 extending from it toward elevator 56. Feeler arms 77 of microswitches 78, 79 and 80 extend below the hold downs 74, 75 and 76. A normally closed microswitch 81 mounted on leg 11 contacts crank 68 so that switch 81 is opened once during each revolution of timing shaft 31.

This invention operates in the following manner. As shown in FIG. 3, conveyor 14 moves aligned rows of baked goods 90 toward elevator 56 until the foremost of the baked goods 90 are arrested against the front edge 91 of elevator 56. The short lengths 15, 16 and 17 of the rollers then rotate freely below the arrested rows of baked goods 90 gently urging them forward. The foremost of the baked goods 90 contacts the fingers 77 of the limit switches 78–80 to close them. As will be described in connection with FIGS. 7 and 10, normally open limit switch 92 is closed on availability of cartons 94 and normally closed limit switch 92 is opened to determine the number of cycles the machine will make to fill each carton 94.

Figure 10:
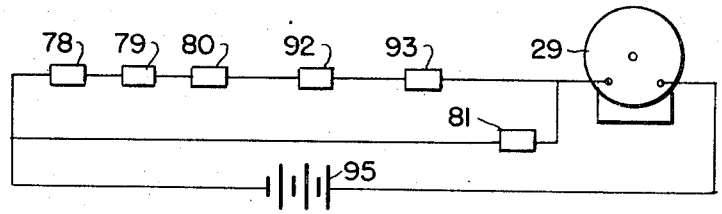
FIG. 10 is a wiring diagram of control switches and a clutch activated thereby.

As shown in FIG. 10, the switches 78, 79, 80, 92 and 93 are connected in series between current source 95 and the electrically operated clutch and brake 29. Thus the contacting of fingers 77 by baked goods 90, if cartons 94 are in position, activates clutch 29 to rotate timing shaft 31 shown in FIG. 1. Rotation of timing shaft 31 allows the normally closed switch 81 to close so that timing shaft 31 will make a complete revolution to complete a cycle before being stopped by crank 68 opening switch 81. Switch 81 is connected in parallel with the switches 78, 79, 80, 92 and 93 so that, if conditions are such that these switches are again all closed, cycles will follow continuously.

As shaft 31 rotates, it lowers elevator 56 and the spring arms 63 which contact and hold back the third from the front of each aligned row of baked goods 90. As shown in FIGS. 3, 3A and 4, belt 14 and a driven transfer rollers 96 move the foremost of the baked goods 90 onto the lowered elevator 56. Transfer roller 96 is mounted on shaft 84. As may be seen in FIG. 3A, roller 96 is driven by a sprocket 81 on shaft 12, a chain 82, and a sprocket 83 mounted on shaft 84. It has been found that the placing of a thin, upstanding transverse bar 97 between transfer roller 96 and the front surface 91 of elevator 56 prevents any "pinch" effect during the lowering of the elevator which would tend to draw the baked goods 90 between roller 96 and the front edge 91.

As the cycle continues, elevator 56 raises to the upper position shown in FIG. 5 with baked goods 90 thereon. Hold downs 74–76 prevent baked goods 90 on the elevator 56 from pulling upward the following baked goods. A pusher bar 70 is aligned with each of the baked goods 90 on elevator 56 and passes over them so that flange 71 slides the baked goods from elevator 56 down delivery slide 72 as shown in FIG. 6.

The front portion 100 of each pusher bar 70 extends over the baked goods 90 in front of flange 71. Two weighted fingers 101 are pivotally mounted by a pin 102 at their front ends on each side of each front portion 100. A top plate 103 acts as a stop to limit the downward pivoting of the weighted fingers 101. As the baked goods 90 are urged forward, the fingers 101 rest on their rear edges. As the baked goods 90 are pushed to project beyond the curved lip 104 of delivery slide 72, the rear edges of the baked goods 90 are held down to prevent their tipping forward too soon. As the baked goods 90 are slid completely past lip 104, the free ends of the pivoted fingers 101 fall downward more rapidly then the free-falling baked goods to depress their rear ends so they will not cock up but will lie flat in the cartons 94.

If each carton 94 is to be packed two deep with baked goods 90, the ratio between sprockets 46 and 47 shown in FIG. 1 will be 1:2 so that two cycles will be completed to slide two layers of baked goods into each carton 94. Since switch 93 shown in FIG. 7 is normally closed and is closed when stop 53 is arresting a carton, it is opened once for each revolution of carton release cam 49. Thus it takes two cycles to complete a revolution of cam 49 and interrupt a double-cycle. Switch 92 is normally open and ensures that there is supply of at least three cartons 94.

Figure 11:
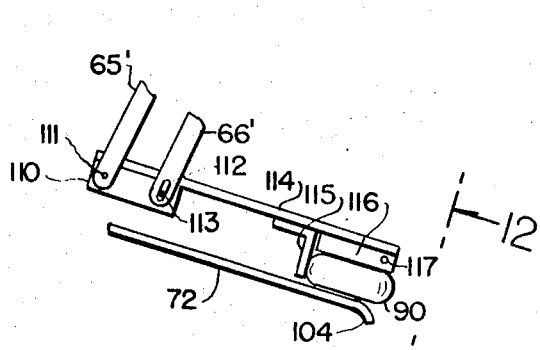
FIG. 11 is a side view of the delivery slide and elements of a modified pusher mechanism.
Figure 12:
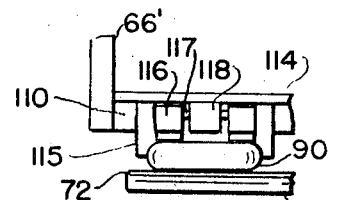
FIG. 12 is a view taken on line 12—12 of FIG. 11 showing a fragment of the modified pusher mechanism.

Referring now to FIGS. 11 and 12, a modification of the pusher mechanism is shown. Arm 65' is pivotally fixed to a transverse bar 110 by a pin 111. Arm 66' contains a longitudinal slot 112 which receives pin 113 extending from bar 110. Projecting forward from bar 110 is a pusher plate 114 having angle irons 115 fixed below it to push each of the baked goods 90 down delivery slide 72. A fixed lug 118 extends forward from each flange 115 and has two weighted fingers 116 fixed pivotally from its front end by a pin 117. The path of lug 118 approaches delivery slide 72 in the direction of lip 104. Movement of pins 113 in slots 112 allow the baked goods 90 to have lug 118 rest on them as they approach lip 104. This movement better guides baked goods 90 on delivery slide 72 despite variations in the size of the baked goods.

Referring now to FIG. 7, drum 39 mounted on driven shaft 38 moves the endless belt 40. By means of pulleys 120, 121 and belt 122, shaft 38 drives shaft 123 and drum 124 mounted on it to move the endless belt 125 at a slower speed than belt 40. A carton stop mechanism 126, the frame of which is shown at 51, stops the foremost carton 94 of those on belts 40 and 125. The carton stop mechanism may be of any suitable type which has a member released to allow a carton 94 to pass it. The member may swivel, drop, or otherwise move. Since the foremost carton 94 rests on the faster moving belt 40 and subsequent cartons 94 rest on the slower moving belt 125, on release of the carton stop mechanism 126 the foremost carton 94 will move away from subsequent cartons 94 allowing the carton stop mechanism 126 to drop its stop member to arrest the subsequent cartons 94. Thus the foremost packed carton 94 is the only carton released on activation of the carton stop mechanism 126.

As may be further seen in FIG. 7, end guides 146 and 147 may be provided to slightly compress oversized baked goods being packed.

Figure 8:
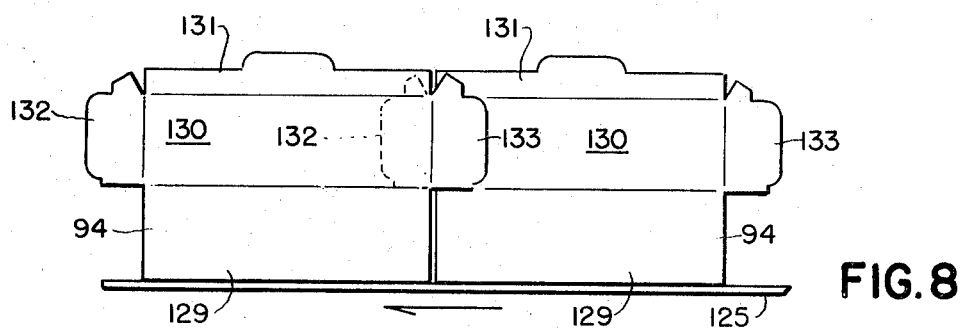
FIG. 8 is a side view of a fragment of the upper run of a section of the carton conveyor showing two containers or cartons thereon.

As shown in FIG. 8, each carton 94 has a base box 129, a lid 130, a closing flap 131 of lid 130, and side flaps 132 and 133. It is desirable that the lead side flap 132 of each carton 94 extend over the base box 129 of a foregoing carton. If this relation is not established and the side flap 133 of a foremost carton 94 extends over the base box 129 of a following carton 94, the weight of baked goods 90 added to the foremost carton will cause its flap 133 to drag the following carton 94 along with it preventing the carton stop mechanism 126 from only releasing one carton 94.

Figure 9:
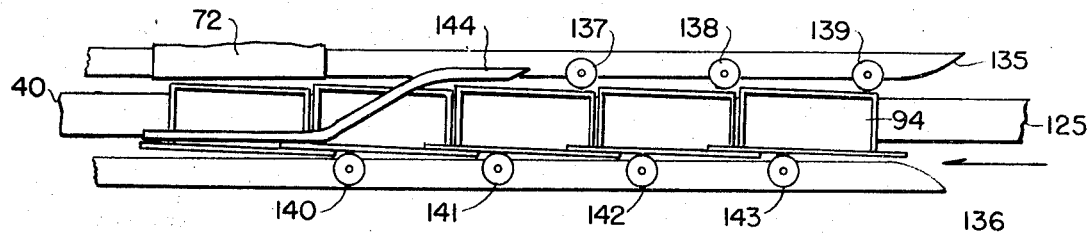
FIG. 9 is a top view of the carton conveyor showing cartons thereon.

As shown in FIG. 9, the desired nesting of the upstanding carton lids 130 is accomplished by the guides 135 and 136. Guides 135 and 136 keep the base boxes 129 on the moving belts 40 and 125. Guide rollers 137, 138 and 139 are spaced a carton length apart to urge the rear ends of cartons 94 away from guide 135. Guide rollers 140, 141, 142 and 143 are also spaced a carton length apart and are mounted high enough to engage and urge the foremost side flaps 132 of the upstanding lids 130 away from guide 136 into the desired overlapping positions shown. A lid guide 144 holds the overlapped lids 130 away from delivery slide 72 in an upstanding position. As the foremost carton 94 is packed with baked goods and released by the carton stop mechanism 126, a carton-forming machine (not shown) delivers a formed carton 94 onto belt 125 to be nested as shown.

In the practice of this invention, it has been found that the angle of the delivery slide 72 should preferably be between 15° and 20° with the horizontal to ensure that the first layer of baked goods 90 will be deposited flat in the bottom of a container or carton 94. In addition, the elevator 56 should remove baked goods 90 at a rate 10 to 15 percent faster than the belt 14 normally delivers them. This allows the machine of this invention to increase its output after short stoppages caused by interruptions in the carton or baked goods supply.

What is claimed is:

1. A packaging machine for baked goods for use with a conveyor belt having aligned rows of baked goods thereon, said packaging machine comprising, in combination, a delivery slide inclined downward in front of said belt and above the level of said belt, an elevator disposed between said slide and said belt, said elevator having a front surface arresting the rows of baked goods on said belt when said elevator is in a raised position, means positioning containers in front of said slide to receive baked goods, a pusher mechanism movably mounted to pass over said elevator and said slide, and drive means lowering said elevator to receive baked goods from said belt, raising said elevator to the level of said slide, and moving said pusher mechanism to push baked goods from said elevator over said slide into containers positioned to receive the baked goods.

2. The combination according to claim 1 wherein said elevator has a top surface and is pivotally mounted so that said top surface moves from a lower horizontal position level with said conveyor to an upper inclined position forming a continuation of said delivery slide.

3. The combination according to claim 2 wherein said conveyor terminates in front of said elevator having sprockets about which said conveyor passes and with the addition of a driven transfer roller disposed at the level of said conveyor in front of said elevator.

4. The combination according to claim 3 with the addition of a thin, upstanding transverse bar disposed at the level of said conveyor between said transfer roller and the front surface of said elevator.

5. The combination according to claim 2 wherein said pusher mechanism has two pairs of support arms pivotally mounted above said delivery slide, a transverse member pivotally connected to the lower ends of said support arms, and a downward extending flange fixed to said transverse member engaging baked goods on said elevator and said slide, said drive means swinging said arms pushing baked goods from said elevator off said slide.

6. The combination according to claim 5 wherein a forwardly extending portion of said transverse member of said pusher mechanism extends in front of said baked goods engaging flange, and with the addition of weighted fingers pivotally connected to the forwardly extending portion of said transverse member, said weighted fingers pivoting by gravity resting upon and holding down the rear portions of baked goods on said slide.

7. The combination according to claim 6 with the addition of central lugs fixed below said forwardly extending portion of said transverse member of said pusher mechanism, said weighted fingers being pivotally connected by their front ends in pairs on each side of said lugs.

8. The combination according to claim 7 wherein one pair of said support arms has a vertical slot and pin connection to said transverse member allowing said lugs to move downward to bear on baked goods being pushed from said slide.

9. The combination according to claim 5 wherein said drive means is a motor, belt drive means enabling said motor to drive said conveyor belt, a clutch, a timing shaft having a first and a second crank thereon, means engaging said clutch enabling said motor to rotate said timing shaft once, a crank arm fixed to one of said support arms of said pusher mechanism, a first link connecting said first crank to said crank arm so that one revolution of said timing shaft swings said pusher mechanism over said elevator and said slide, and a second link connecting said second crank to said elevator so that one revolution of said timing shaft lowers and raises said elevator.

10. The combination according to claim 9 with the addition of pivotally mounted spring arms fixed over each row of baked goods on said conveyor belt, and a third link connecting said spring arms with said elevator so that lowering of said elevator depresses said spring arms arresting the rows of baked goods on the belt.

11. The combination according to claim 10 with the addition of a fixed hold down disposed over said belt a distance greater than the thickness of baked goods over each row of baked goods in front of said elevator.

12. The combination according to claim 9 wherein said means positioning containers in front of said slide comprises a first faster conveyor and a second slower conveyor driven by said motor, a carton stop arresting a line of cartons on said conveyors, the first carton of the line being disposed below said delivery slide to receive baked goods therein, and means driven by said timing shaft releasing said carton stop to pivot allowing a first packed carton to pass it, the first carton moving on said faster conveyor leaving a gap between the first carton and the next carton in line on said slower conveyor so that said carton stop will arrest the second carton for packing.

13. The combination according to claim 12 wherein said cartons have upstanding lids with side flaps and with the addition of horizontally mounted guide rollers disposed a carton length apart on each side of said conveyors cocking cartons on said conveyors so that the side flap of each following carton rests on the carton in front of it.

14. The combination according to claim 12 wherein said clutch is electrically activated, and with the addition of a normally closed switch opened once each revolution of said timing shaft, normally open switches sensing the presence of the first in the lines of baked goods on said belt, a normally open switch sensing the presence of a carton on said conveyors, a normally open switch sensing the carton-arresting position of said carton stop, and a current source connected to said clutch through said normally open switches in series and through said normally closed switch in parallel.

* * * * *